United States Patent
Tan et al.

(10) Patent No.: US 11,503,347 B2
(45) Date of Patent: Nov. 15, 2022

(54) METHOD OF PLAYING VIDEO, COMPUTING DEVICE, AND COMPUTER PROGRAM PRODUCT

(71) Applicant: Shanghai Bilibili Technology Co., Ltd., Shanghai (CN)

(72) Inventors: Zhaoxin Tan, Shanghai (CN); Wenjie Fan, Shanghai (CN); Hao Liu, Shanghai (CN); Junyi Wu, Shanghai (CN)

(73) Assignee: SHANGHAI BILIBILI TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 17/304,725

(22) Filed: Jun. 24, 2021

(65) Prior Publication Data

US 2021/0321149 A1    Oct. 14, 2021

Related U.S. Application Data

(63) Continuation of application No. PCT/CN2019/128452, filed on Dec. 25, 2019.

(30) Foreign Application Priority Data

Jan. 30, 2019    (CN) .......................... 201910091820.9

(51) Int. Cl.
*H04N 21/222*     (2011.01)
*H04N 21/2225*    (2011.01)
(Continued)

(52) U.S. Cl.
CPC ... *H04N 21/23106* (2013.01); *H04N 21/2393* (2013.01); *H04N 21/234363* (2013.01);
(Continued)

(58) Field of Classification Search
CPC .................... H04N 21/2393; H04N 21/23106
See application file for complete search history.

(56) References Cited

U.S. PATENT DOCUMENTS 10,277,669 B1 *  4/2019  Joliveau ................. H04L 67/02
11,290,757 B2 *  3/2022  Giladi ............... H04N 21/2393
(Continued)

FOREIGN PATENT DOCUMENTS

CN       101741730 A2    6/2010
CN       102217322 A     10/2011
(Continued)

OTHER PUBLICATIONS

Supplementary European Search Report of counterpart EP application No. 19914121.9, dated Oct. 25, 2021, 1 page.
(Continued)

*Primary Examiner* — Hsiungfei Peng
(74) *Attorney, Agent, or Firm* — Kilpatrick Townsend & Stockton LLP

(57) ABSTRACT

A method of playing video is provided. The method includes: obtaining a video loading instruction and sending a loading request to a cache server, wherein the loading request is configured to request loading data, and the loading data includes at least one segment of the video corresponding to the video loading instruction; receiving the loading data from the cache server; and playing the at least one segment according to the loading data.

11 Claims, 6 Drawing Sheets

(51) Int. Cl.

| | | |
|---|---|---|
| *H04N 21/2343* | (2011.01) | |
| *H04N 21/24* | (2011.01) | |
| *H04N 21/262* | (2011.01) | |
| *H04N 21/438* | (2011.01) | |
| *H04N 21/8543* | (2011.01) | |
| *H04N 21/231* | (2011.01) | |
| *H04N 21/239* | (2011.01) | |
| *H04N 21/435* | (2011.01) | |
| *H04N 21/437* | (2011.01) | |
| *H04N 21/647* | (2011.01) | |
| *H04N 21/845* | (2011.01) | |

(52) U.S. Cl.
CPC ......... *H04N 21/435* (2013.01); *H04N 21/437* (2013.01); *H04N 21/64738* (2013.01); *H04N 21/8456* (2013.01)

(56) References Cited

U.S. PATENT DOCUMENTS

| | | |
|---|---|---|
| 2011/0080940 A1 | 4/2011 | Bocharov et al. |
| 2013/0179541 A1 | 7/2013 | Chen |
| 2014/0129790 A1 | 5/2014 | Zhu et al. |
| 2016/0127798 A1 | 5/2016 | Yamagishi |
| 2016/0227258 A1* | 8/2016 | Zhang ................ H04N 21/2183 |
| 2018/0241836 A1 | 8/2018 | Arsenault et al. |
| 2019/0014358 A1* | 1/2019 | Takabayashi ...... H04N 21/2393 |
| 2019/0379876 A1* | 12/2019 | Hur .................... H04N 21/2393 |

FOREIGN PATENT DOCUMENTS

| | | |
|---|---|---|
| CN | 102447973 A | 5/2012 |
| CN | 102801690 A | 11/2012 |
| CN | 103748888 A | 4/2014 |
| CN | 104025604 A | 9/2014 |
| CN | 104125516 A | 10/2014 |
| CN | 104184741 A | 12/2014 |
| CN | 104506493 A | 4/2015 |
| CN | 105376218 A | 3/2016 |
| CN | 106331898 A | 1/2017 |
| CN | 106559677 A | 4/2017 |
| CN | 106993014 A | 7/2017 |
| EP | 2869579 A1 | 5/2015 |
| WO | WO2017017018 A1 | 2/2017 |

OTHER PUBLICATIONS

Wang Yuanxun, "Design and Implementation of Streaming Media Video Transmission System Based on Mpeg-DASH," Southwest Jiaotong University, Master Degree Thesis, May 28, 2016, 73 pages.
Zhang, Yangyang, "Adaptive Video Transmission Algorithm of DASH," University of Science and Technology of China, A Dissertation for Master's Degree, May 24, 2016, 83 pages.

* cited by examiner

METHOD OF PLAYING VIDEO, COMPUTING DEVICE, AND COMPUTER PROGRAM PRODUCT

CROSS-REFERENCE TO RELATED APPLICATIONS

The present application is a continuation under 35 U.S.C. 111(a) of PCT International Application No. PCT/CN2019/128452, filed on Dec. 25, 2019, which claims priority to Chinese patent application No. 201910091820.9 filed on Jan. 30, 2019, the entire contents of which are hereby incorporated by reference in their entirety for all purposes.

TECHNICAL FIELD

The present application relates to a technical field of computers, and more particularly to a method of playing video, a computing device, and a computer-program product.

BACKGROUND

With the development of Internet technology, network video has gradually become one of the most popular Internet applications. At present, in related art, all segments corresponding to a video are stored in a source station. When playing the video through a web, the web needs to load the video segments from the source station and then play them.

SUMMARY

The present application provides a method of playing video, including: obtaining a video loading instruction and sending a loading request to a cache server, wherein the loading request is configured to request loading data, and the loading data includes at least one segment of the video corresponding to the video loading instruction; receiving the loading data returned by the cache server; and playing the at least one segment according to the loading data.

The present application also provides a computing device, including: one or more processors; one or more non-transitory computer-readable storage mediums containing instructions configured to cause the one or more processors to implement the method described above.

The present application also provides a computer-program product tangibly embodied in a machine-readable non-transitory storage medium that includes instructions configured to cause one or more processors to implement the method described above.

DETAILED DESCRIPTION

To make the objectives, technical solutions and advantages of the present application more comprehensible, the present application is described in further detail below with reference to embodiments and the accompanying drawings. It should be understood that the specific embodiments described herein are merely used for explaining the present application, and are not intended to limit the present application. All other embodiments obtained by those skilled in the art based on the embodiments of the present application without creative efforts shall fall within the protection scope of the present application.

In the process of implementing the concept of the present application, the inventors found that the related art has at least the following defects: when loading video segments from the source station, it needs to select from a huge node group, causing the video start-up speed too slow and the waiting time of users too long, and resulting in a loss of users.

In the method of playing video provided by the present application, a user triggers a loading signal of the video through a client; the client obtains a video loading instruction and sends a loading request to the cache server to request the loading data, where the loading data includes at least one segment of the video. After receiving the loading request, the cache server can obtain the loading data stored locally and return the loading data to the client. Further, the client can play at least one segment according to the loading data. Since the embodiments of the present application store at least one segment of the video in the cache server in advance, when the client plays the video, the segment of the video can be obtained from the cache server first, which can avoid the defects in related art that loading video segments from the source station is easy to cause the video start-up speed too slow and the waiting time of users too long, resulting in users loss, and can achieve the technical effect of increasing video start-up speed.

Figure 1:
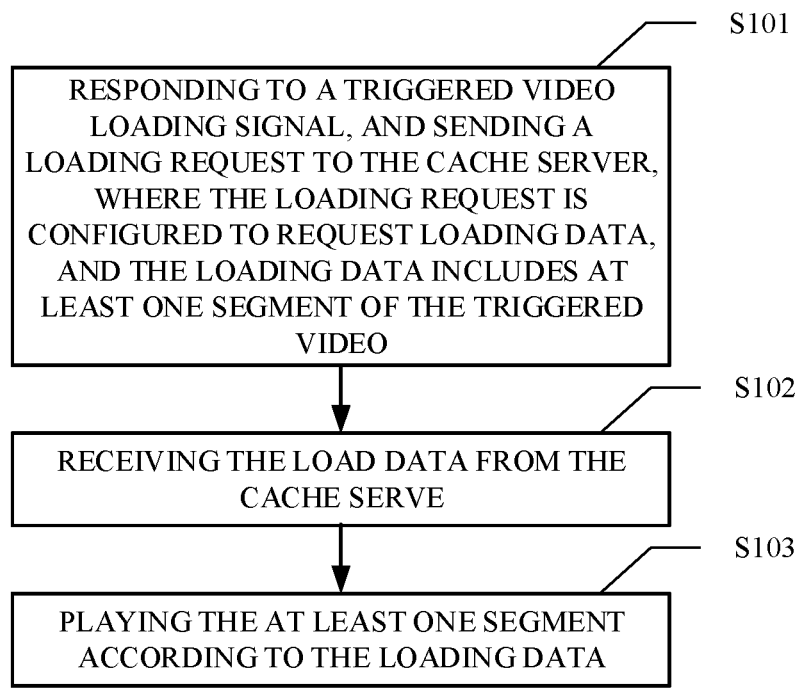
FIG. 1 illustrates a flowchart of a method of playing video applied to a client according to an embodiment of the present application.

FIG. 1 illustrates a flowchart of a method of playing video applied to a client according to an embodiment of the present application.

As shown in FIG. 1, the method of playing video applied to the client may include the following steps S101-S103.

Step S101, obtaining a video loading instruction and sending a loading request to the cache server, where the loading request is configured to request loading data, and the loading data includes at least one segment of the video corresponding to the video loading instruction.

According to some embodiments of the present application, a MPD (Media Presentation Description) file of a popular video and at least one segment with the most popular resolution of the popular video may be stored in the cache server, and other segments of the popular video are stored in a source server. According to some embodiments, the at least one segment includes a first segment and the at least one segment is the segment(s) arranged in uninterrupted sequence according to the segment order. According to some embodiments of the present application, the selection of popular videos can be sorted regularly, and correspondingly, the selection of the most popular resolution of the popular video can also be sorted regularly.

For example, for video A, video B, video C, and video D, they are sorted as video A, video B, video C, and video D according to the number of views. If the top two videos are specified as the popular videos, video A and video B are both popular videos. The resolution of each video is divided into standard resolution, high resolution, super resolution, and blue light, and high resolution is the most popular resolution corresponding to video A, and super resolution is the most popular resolution corresponding to video B, then a MPD file of video A, a few segments with high resolution in video A, a MPD file of video B, and a few segments with super resolution in video B are stored in the cache server correspondingly.

According to some embodiments of the present application, the video loading instruction may be an instruction sent by the user to the client through a mouse, a button, a touch screen, and so on. For example, the user clicks the video on a display screen of the client with the mouse, and meanwhile the "click" operation is to issue a video loading instruction, which corresponds to the video on the display screen. Further, the client can obtain the loading instruction of the video, that is, respond to the video loading instruction.

According to some embodiments of the present application, the loading data also includes related data of a playing interface of playing the video. The related data may be, for example, a title bar, a user account, a plot profile, and so on. The client may include but is not limited to a web and a client. If the client is a web, the playing interface may be a playing webpage for playing videos on the web; if the client is a client, the playing interface may be a playing interface of video playing software installed on the client.

According to some embodiments of the present application, before the client plays the video, a loading request of loading data may be sent to the cache server, the loading request may include a video tag such as a video ID, and the loading data may include at least one segment of the video and related data of the playing interface configured to play the video. The cache server can judge whether at least one segment corresponding to the video tag is stored locally based on the video tag, and if so, the above loading data can be returned to the client.

Step S102, receiving the loading data returned by the cache server.

In some embodiments of the present application, if the cache server determines that at least one segment of the video is stored locally, it may return the corresponding loading data to the client.

Step S103, playing the at least one segment according to the loading data.

In some embodiments of the present application, playing the at least one segment according to the loading data may include: playing the at least one segment on the playing interface, and displaying the related data on the playing interface. According to some embodiments, when playing the at least one segment on the playing interface, the related data may be displayed at a corresponding position on the playing interface.

According to some embodiments of the present application, the loading data further includes a MPD file of the video, and the method further includes: parsing the MPD file to obtain a parsing result; determining segment information of the next segment of the at least one segment according to the parsing result; and sending a first segment loading request for the next segment to the source server according to the segment information, where the source server divides the video into a plurality of segments through DASH (Dynamic Adaptive Streaming over HTTP) technology, the plurality of segments include the at least one segment, and the at least one segment in the cache server is obtained through the source server.

It should be noted that DASH is a dynamic adaptive stream based on HTTP, similar to HLS protocol, and DASH enables high quality streaming media can be transmitted over HTTP protocol through an adaptive bit rate streaming technology. DASH technology breaks the content of streaming into a series of small file segments based on HTTP, and each of the file segments contains a playable content with short length, while the total length of the file content may be up to several hours (such as movies or live sports events). The file content will be made into alternative pieces of a plurality of bitrates to provide a plurality of bitrate versions for selection. When the file content is played back by the client, the client will automatically choose which one of the alternative pieces to download and play according to a current network condition. The client will select the highest bitrate segment that can be downloaded in time for playing, so as to avoid playing stuck or rebuffering events. As a result, the client with less occurrence of stuck and rebuffering can adapt to changing network conditions smoothly and provide high-quality playing experience. In some embodiments of the present application, the server can divide the video content into a plurality of segments through DASH technology, and the length of each segment can be customized, such as 2S, 5S, 10s, etc. According to some embodiments of the present application, the MPD file is a description file of a video, which can be configured to describe the composition of the entire MPEG DASH (also known as DASH) code stream, and the MPD file is equivalent to M3U8 file (M3U8 is a video Format) with protocol of HLS (HTTP Live Streaming). The MPD file is an XML (Extensible Markup Language) Document (Document is a computer terminology, each HTML (Hyper Text Markup Language) document loaded into a browser will become a Document object), through the content of which a URL (Uniform Resource Locator) for downloading by HTTP GET request (HTTP GET request is a way of HTTP request) can be constructed. The MPD file can describe the segment information of each segment of the video, such as the resolution, the length of the segment, and so on.

In some embodiments of the application, after receiving the MPD file returned by the cache server, the segment information of the next segment of at least one segment can be determined by parsing the MPD file. Since other segments of the video are stored in the source server, a first segment loading request for the next segment can be sent to the source server according to the above segment information. The source server can return the next segment according to the request, and then the client can continue to play the video.

The sending a first segment loading request for the next segment to the source server includes: determining a first resolution of the first segment; determining the resolution of the next segment as the first resolution; and sending a first segment loading request for the next segment whose resolution is the first resolution, to the source server according to the segment information.

In some embodiments of the present application, since each segment stored in the source server may correspond to a plurality of resolutions, the first segment loading request sent to the source server may include resolution information. For example, in order to ensure the visual effect viewed by the user, the resolution of the next segment may be the same as the resolution of the at least one segment.

However, if the next segment is required to take the same resolution as the at least one segment, especially when the resolution of the at least one segment is better, the next segment may be not loaded successfully due to poor network signal quality and other reasons, and then the user will not be able to continue to watch the video. At this time, the following method can be used:

As an optional embodiment, the sending a first segment loading request for the next segment whose resolution is the first resolution to the source server according to the segment information includes: determining a target CDN (Content Delivery Network) corresponding to the video; and sending the first segment loading request for the next segment to the source server according to the segment information, where the first segment loading request includes the target CDN, and the source server is configured to determine the resolution of the next segment according to the target CDN. The source server includes multiple correspondences, and each correspondence includes a CDN and a history network speed corresponding to the CDN. The source server is used to determine the history network speed corresponding to the target CDN according to the multiple correspondences, and determine the resolution of the next segment according to the corresponding history network speed of the target CDN.

According to some embodiments of the present application, since the at least one segment is loaded from the cache server along with the loading request, there is no network speed for loading the segment at this time, that is, some embodiments of the present application cannot determine the resolution of the next segment according to the average network speed of this time. At this time, the resolution of the next fragment can be determined by the history network speed corresponding to the target CDN. For the same user, the history network speed corresponding to the target CDN may include the network speed when history clients use the target CDN to play video. According to some embodiments, it may be the average network speed when the client used the target CDN to play the video last time.

It should be noted that before some embodiments of the present application is applied, the source server may have stored a plurality of history network speeds and a CDN corresponding to each history network speed, and can store them in a map. For example, the stored data format map includes three CDNs and history speeds corresponding to each CND, which are: 'cdna.acgvideo.com': 400 KB/s; 'cdnb.acgvideo.com': 500 KB/s; 'cdnc.acgvideo.com': 900 KB/s. If the video is scheduled to cdnb.acgvideo.com (the target CDN), the history network speed corresponding to the target CDN can be 500 KB/s.

Further, the source server may determine the resolution of the next segment according to the history network speed corresponding to the target CDN, specifically, the source server also stores a plurality of preset resolutions and a playing code rate corresponding to each preset resolution. The source server can calculate the maximum supportable playing code rate according to a preset formula firstly, and then determine a maximum playing code rate which the maximum supportable playing code rate is greater than or equal to from a plurality of playing code rates, and the preset resolution corresponding to the maximum playing code rate which the maximum supportable playing code rate is greater than or equal to is taken as the resolution of the next segment.

The preset formula for calculating the maximum supportable playing code rate is:

$$K = S \times 8 \times N$$

Where K represents the maximum supportable playing code rate, S represents the history network speed corresponding to the CDN, and N represents the preset security weight value.

For example, if the history network speed corresponding to the target CDN is 500 KB/s, and the preset security weight value is 0.9, the maximum supportable playing code rate K=3600 kbps. The corresponding relationship between the preset resolution of the video and the playing code rate is: 1080P +: 8000 kbps; 1080P: 4000 kbps; 720P: 2000 kbps; 480P: 1000 kbps; 360P: 500 kbps. Since the calculated maximum supportable playing code rate is 3600 kbps, and the maximum playing code rate which the calculated maximum supportable playing code rate is greater than or equal to is 2000 kbps, and the preset resolution corresponding to the playing code rate 2000 kbps is 720P, 720P can be taken as the resolution of the next video segment.

As an optional embodiment, the method of playing video may further comprise: if the cache server does not store at least one segment, creating a second segment loading request for requesting at least one segment from the source server; and sending the segment loading request to the source server, so that the source server returns at least one segment based on the second segment loading request. According to some embodiments, if the cache server determines that at least one segment is not stored locally, the cache server may only return the related data of the playing interface to the client, and the client may recreate a second segment loading request for requesting the at least one segment, and send the second segment loading request to the source server, so that the source server can return the at least one fragment.

Figure 2:
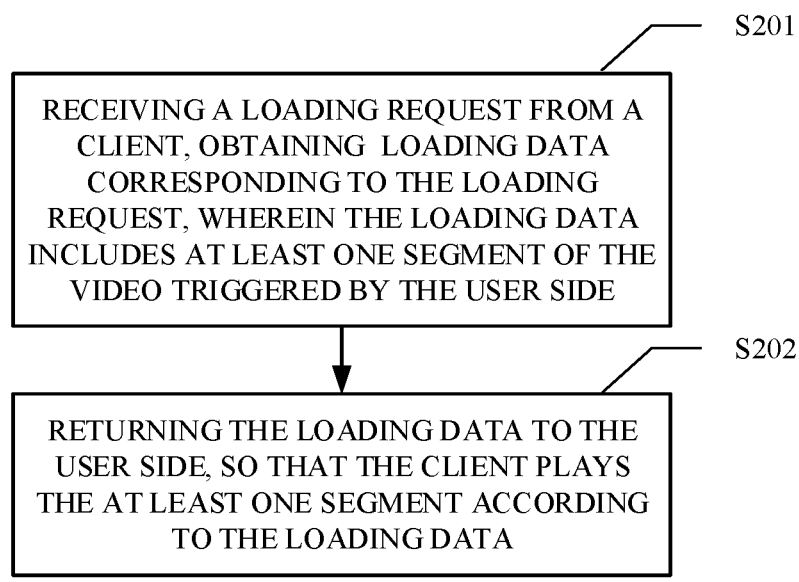
FIG. 2 illustrates a flowchart of a method of playing video applied to a cache server according to an embodiment of the present application.

FIG. 2 illustrates a flowchart of a method of playing video applied to a cache server according to an embodiment of the present application.

As shown in FIG. 2, the method of playing video applied to the cache server may include the following steps S1201-S202.

Step S201, receiving a loading request sent by a client, obtaining loading data corresponding to the loading request, where the loading data includes at least one segment of the video triggered by the client.

In some embodiments of the present application, the obtaining loading data corresponding to the loading request may comprise: determining whether the at least one segment has been stored; obtaining the loading data corresponding to the loading request if have determined the at least one segment has been stored. The loading request may further include a video tag, and the loading data may further include related data of a playing interface of playing the video and a MPD file of the video. After receiving the loading request sent by the client, the cache server may look for the at least one segment according to the video tag in the loading request, and if it can be found, obtain the at least one segment, the MPD file, and the related data, and return the at least one segment, the MPD files and the related data to the client.

It should be noted that the at least one segment in the cache server is obtained through the source serve, and the source server divides the video into a plurality of segments through DASH technology, the plurality of segments include the at least one segment. A staff can periodically send at least one segment of the popular video and the MPD file of the popular video from the source server to the cache server, or the cache server can actively obtain at least one segment of the popular video and the MPD file of the popular video from the source server. Here are not specifically limited in some embodiments of the present application.

Step S202, returning the loading data to the client, so that the client plays the at least one segment according to the loading data.

According to some embodiments of the present application, the cache server may send the loading data to the client, and after receiving the loading data, the client may play the at least one segment according to the loading data. For example, the client can play the at least one segment on the playing interface and display the related data on the playing interface.

In the method of playing video provided by the present application, the client obtains a video loading instruction and sends the loading request to the cache server to request the loading data, where the loading data includes at least one segment of the video. After receiving the loading request, the cache server can obtain the loading data stored locally and return the loading data to the client, further, the client can play at least one segment according to the loading data. Since some embodiments of the present application store at least one segment of the video in the cache server in advance, when the client plays the video, the segment of the video can be obtained from the cache server firstly, which can avoid the defects in related art that loading video segments from the source station is easy to cause video speed slow and waiting time of users long, resulting in users loss, achieving the technical effect of increasing video start-up speed.

Figure 3:
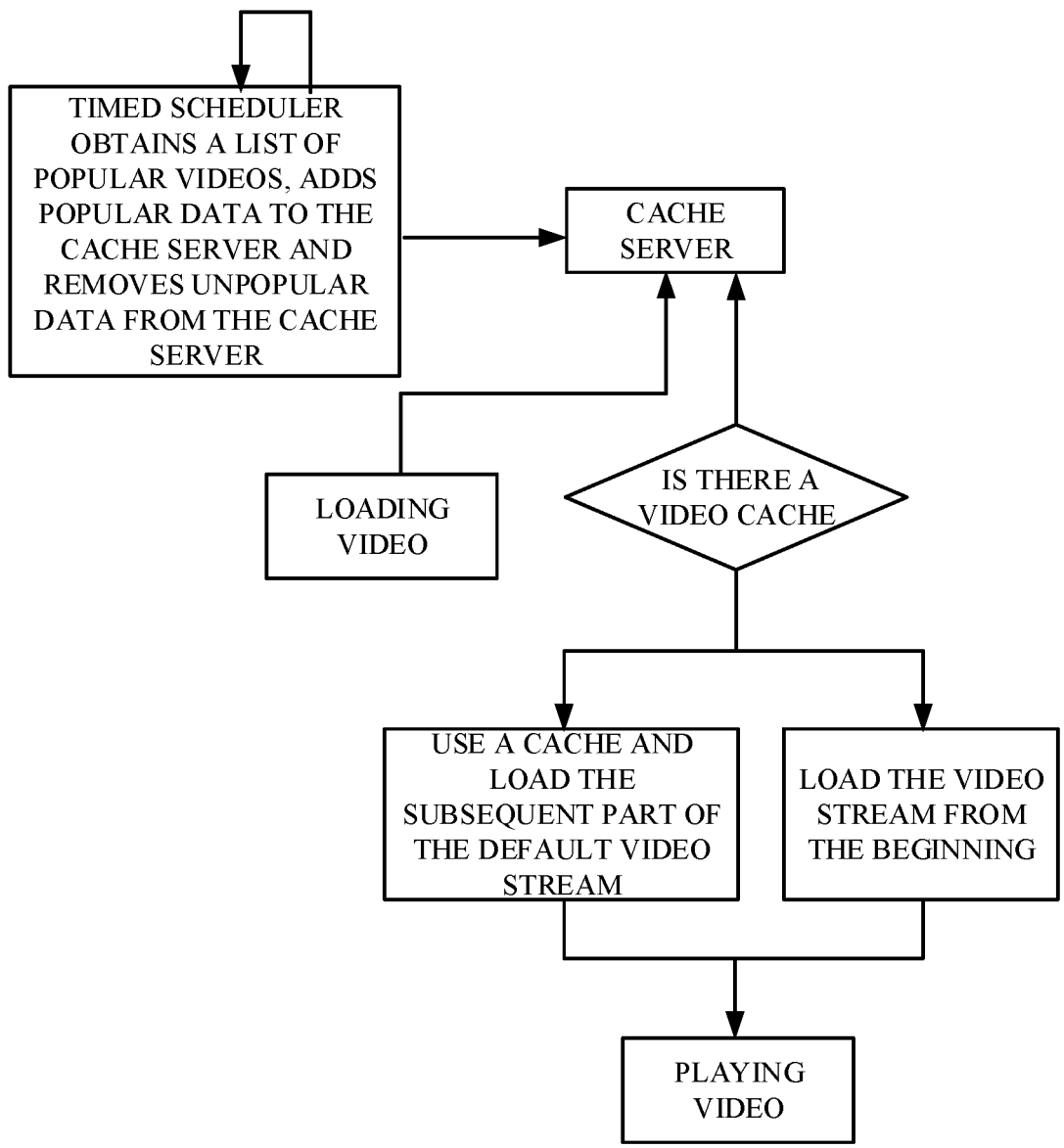
FIG. 3 illustrates a schematic diagram of a method of playing video according to an embodiment of the present application.

FIG. 3 illustrates a schematic diagram of a method of playing video according to an embodiment of the present application.

As shown in FIG. 3, the source server can regularly schedule the program to obtain a list of popular videos, and add the MPD file of the popular video and at least one segment of the hottest resolution of the popular video to the cache server, and can also remove unpopular videos from the cache server to avoid the unpopular video occupying resources of the cache server. When the client plays a popular video, it can interact with the cache server firstly. The cache server determines whether there is at least one segment of the video stored locally, if the at least one segment of the video is stored locally, the cache server returns the at least one segment and corresponding MPD file to the client. The client can use a cache and load the subsequent part of the default video stream, that is, the subsequent segments. If the at least one segment is not stored in the cache server, the client can request the source server for the at least one segment, that is, load the video stream from the beginning. After the client obtains the at least one segment, it can start playing the video.

In some embodiments of the present application, through storing the MPD file of the popular video and at least one segment of the hottest resolution in the cache server, when the client requests for loading the video, the pre-fetched video data can be directly returned. In some embodiments of the present application, the video can be played faster by using the cached data, and based on the characteristics of DASH and the subsequent splicing of video with all resolutions, video with any resolution can be started quickly. The DASH characteristic of some embodiments of the present application is, for example, that one video includes a plurality of segments, and each segment corresponding to a plurality of resolutions, and segments of any resolution can be spliced.

Figure 4:
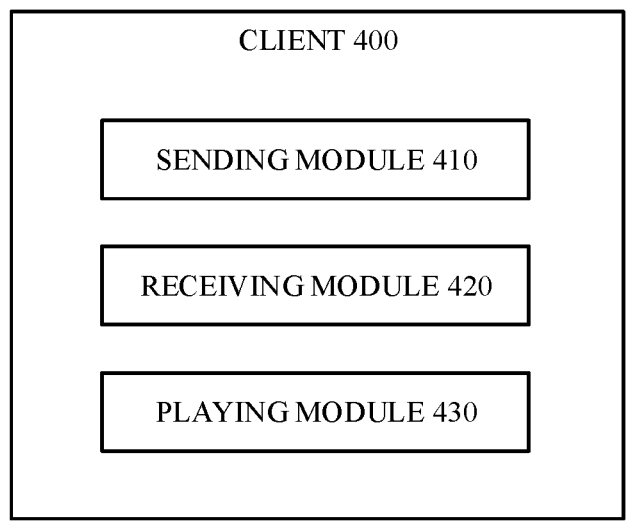
FIG. 4 illustrates a block diagram of a client according to an embodiment of the present application.

FIG. 4 illustrates a block diagram of a client according to an embodiment of the present application.

As shown in FIG. 4, the client 400 may include a first sending module 410, a receiving module 420, and a playing module 430.

The first sending module 410 is configured to send a loading request to the cache server in response to a triggered video loading signal, where the loading request is configured to request loading data, and the loading data includes at least one segment of the triggered video.

The receiving module 420 is configured to receive the load data returned by the cache serve.

The playing module 430 is configured to play the at least one segment according to the loading data.

As an optional embodiment, the loading data further includes related data of a playing interface of playing the video, the playing module is further configured to play the at least one segment on the playing interface, and display the related data on the playing interface.

As an optional embodiment, the loading data further includes a MPD file of the video, and the client may further include a parsing module configured to parse the MPD file to obtain a parsing result, a determining module configured to determine segment information of the next segment of the at least one segment according to the parsing result, a second sending module configured to send a first segment loading request for the next segment to a source server according to the segment information, where the source server divides the video into a plurality of segments through DASH technology, the plurality of segments include the at least one segment, and the at least one segment in the cache server is obtained through the source server.

As an optional embodiment, the second sending module may include a first determining unit configured to determine the first resolution of the first segment, a second determining unit configured to determine the resolution of the next segment as the first resolution, and a first sending unit configured to send a first segment loading request for the next segment whose resolution is the first resolution to the source server according to the segment information.

As an optional embodiment, the second sending module may include a third determining unit configured to determine a target CDN corresponding to the video, and a second sending unit configured to send the first segment loading request for the next segment to the source server according to the segment information, where the first segment loading request includes the target CDN, and the source server is configured to determine the resolution of the next segment according to the target CDN.

As an optional embodiment, the source server includes a plurality of correspondences, each of which includes a CDN and a history network speed corresponding to the CDN, and the source server is configured to determine the history network speed corresponding to the target CDN according to the plurality of correspondences, and determine the resolution of the next segment according to the history network speed corresponding to the target CDN.

As an optional embodiment, the client may further include a creating module configured to create a second segment loading request for requesting source server for a first segment if the cache server does not store the first segment, and a third sending unit configured to send the second segment loading request to the source server, so that the source server returns the first segment based on the second segment loading request.

Figure 5:
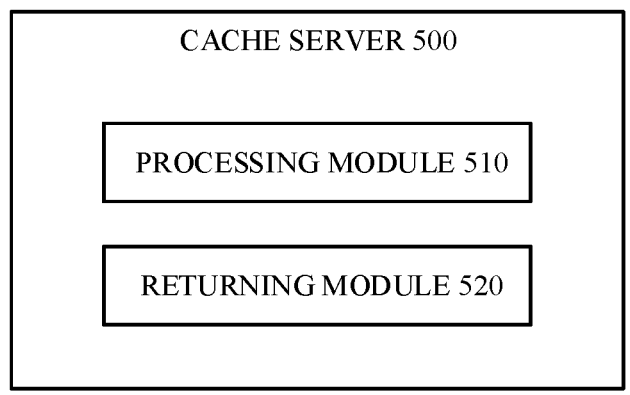
FIG. 5 illustrates a block diagram of a cache server according to an embodiment of the present application.

FIG. 5 illustrates a block diagram of a cache server according to an embodiment of the present application.

As shown in FIG. 5, the cache server 500 may include a processing module 510 and a returning module 520.

The processing module 510 is configured to receive a loading request sent by a client, and obtain loading data corresponding to the loading request, where the loading data includes at least one segment of the video triggered by the client.

The returning module 520 is configured to return the loading data to the client, so that the client plays the at least one segment according to the loading data.

As an optional embodiment, the loading data further includes related data of a playing interface for playing the video and a MPD file of the video.

As an optional embodiment, the processing module may include a determine unit configured to determine whether the at least one segment has been stored, and an obtaining unit configured to obtain the loading data corresponding to the loading request if the at least one segment is stored.

As an optional embodiment, the at least one segment in the cache server is obtained through the source server, and the source server divides the video into a plurality of segments through DASH technology, the plurality of segments include the at least one segment.

The present application also provides a system of playing video includes a client and a catch server. The client obtains a video loading instruction and sends a loading request to the cache server, where the loading request is configured to request the loading data, and the loading data includes at least one segment of the video corresponding to the video loading instruction. The cache server receives the loading request sent by the client, obtains the loading data corresponding to the loading request, and returns the loading data to the client. The client receives the loading data returned by the cache server, and plays the at least one segment according to the loading data.

Figure 6:
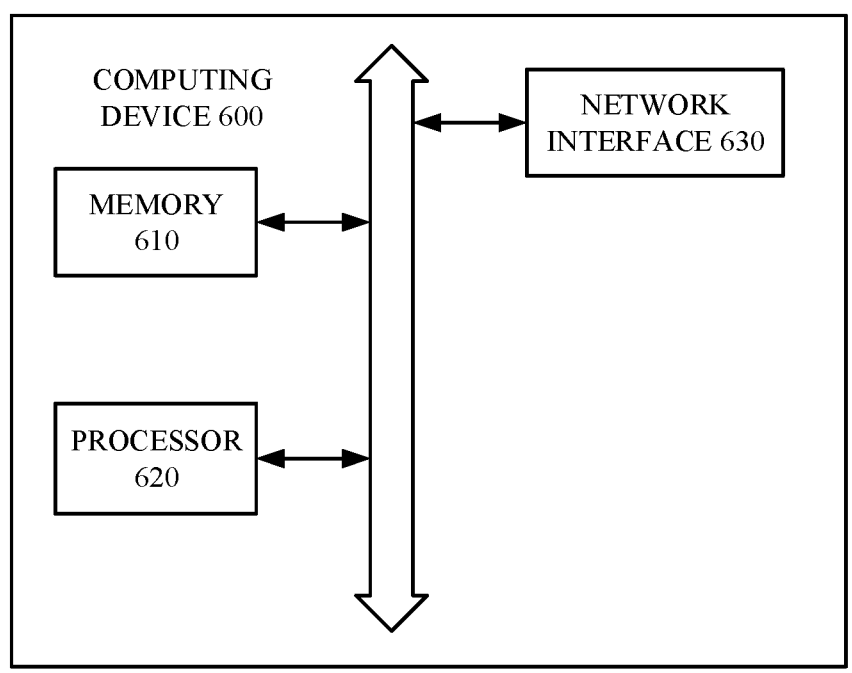
FIG. 6 illustrates a diagram of hardware architecture of a computing device suitable for implementing a method of playing video applied to a client or a method of playing video applied to a cache server according to an embodiment of the present application.

FIG. 6 illustrates a diagram of hardware architecture of a computing device suitable for implementing a method of playing video applied to a client or a method of playing video applied to a cache server according to an embodiment of the present application. According to some embodiments, the computing device 600 is a device capable of automatically performing numerical calculations and/or information processing according to predefined or stored instructions. For example, it can be a smartphone, tablet, laptop, desktop computer, rack server, blade server, tower server, or cabinet server (including stand-alone servers, or a cluster of multiple servers), and so on. As shown in FIG. 6, the computing device 600 includes, but is not limited to, a memory 610, a processor 620, and a network interface 630 that can be communicated with each other through a system bus.

The memory 610 includes at least one type of computer-readable storage medium. The computer-readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the memory 610 may be an internal storage module of the computing device 600 such as a hard disk or memory of the computing device 600. In other embodiments, the memory 610 may also be an external storage device of the computing device 600, such as a plugged hard disk provided on the computing device 600, a smart media card (SMC), secure digital (SD) card, a flash memory card, and the like. Of course, the memory 610 may also include both an internal storage module and an external storage device of the computing device 600. In some embodiments, the memory 610 is generally used to store an operating system and various types of application software installed in the computing device 600 such as program codes of the method of playing video applied to the client or program code of the method of playing video applied to the cache server and the like. In addition, the memory 610 may also be used to temporarily store various types of data that have been or will be outputted.

The processor 620, in some embodiments, may be a central processing unit (CPU), a controller, a microprocessor, or other data processing chip. The processor 620 is generally used to control the overall operation of the computing device 600 such as performing control and processing related to data interaction or communication with the computing device 600. In some embodiments, the processor 620 is used to run program code stored in the memory 610 or process data.

The network interface 630, which is generally used to establish a communication connection between the computing device 600 and other computing devices, may include a wireless network interface or a wired network interface. For example, the network interface 630 is used for connecting the computing device 600 to an external terminal via a network and establishing a data transmission channel and a communication connection between the computing device 600 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and the like.

It is to be noted that FIG. 6 shows only a computing device 600 having components 610-630, but it is understood that it is not required to implement all of the shown components and that more or fewer parts can be implemented in lieu thereof.

In some embodiments, the method of playing video applied to the client or the method of playing video applied to the cache server stored in the memory 610 may be divided into one or more program modules and may be executed by one or more processors (processor 620 in some embodiments) to implement the present application.

According to some embodiments a non-transitory computer-readable storage medium is also provided, which stores computer-readable instructions that, upon executed by a processor, cause the processor to implement the following step:

obtaining a video loading instruction and sending a loading request to a cache server, where the loading request is configured to request loading data, and the loading data includes at least one segment of the video corresponding to the video loading instruction;

receiving the loading data returned by the cache server; and playing the at least one segment according to the loading data.

In some embodiments, the non-transitory computer-readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the memory may be an internal storage module of the computing device such as a hard disk or memory of the computing device. In other embodiments, the computer-readable storage medium may also be an external storage device of the computing device, such as a plugged hard disk provided on the computing device, a smart media card (SMC), secure digital (SD) card, a flash memory card, and the like. Of course, the computer-readable storage medium may also include both an internal storage module and an external storage device of the computing device. In some embodiments, the computer-readable storage medium is generally used to store an operating system and various types of application software installed in the computing device such as program codes of the method of playing video applied to the client or program code of the method of playing video applied to the cache server and the like. In addition, the computer-readable storage medium may also be used to temporarily store various types of data that have been or will be outputted.

According to some embodiments, a non-transitory computer-readable storage medium is provided, which stores thereon computer-readable instructions, when executed by a processor, to implement steps of:

receiving a loading request sent by a client, and obtaining loading data corresponding to the loading request, where the loading data includes at least one segment of the video triggered by the client;

returning the loading data to the client, so that the client plays the at least one segment according to the loading data.

In some embodiments, the computer-readable storage medium includes flash memory, hard disk, multimedia card, card type memory (e.g., SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk, etc. In some embodiments, the memory may be an internal storage module of the computing device such as a hard disk or memory of the computing device. In other embodiments, the computer-readable storage medium may also be an external storage device of the computing device, such as a plugged hard disk provided on the computing device, a smart media card (SMC), secure digital (SD) card, a flash memory card, and the like. Of course, the computer-readable storage medium may also include both an internal storage module and an external storage device of the computing device. In some embodiments, the computer-readable storage medium is generally used to store an operating system and various types of application software installed in the computing device such as program codes of the method of playing video applied to the client or program code of the method of playing video applied to the cache server and the like. In addition, the computer-readable storage medium may also be used to temporarily store various types of data that have been or will be outputted.

Apparently, it should be appreciated by those skilled in the art that each module or step described in some embodiments of the present application can be realized by a general-purpose computing device, and that the modules or steps may be integrated on a single computing device or distributed on a network consisting of a plurality of computing devices, optionally, the modules or steps may be realized by executable program codes so that the modules or steps can be stored in a storage device to be executed by a computing device, and in some cases, the steps shown or described herein can be executed in a sequence different from this presented herein, or the modules or steps are formed into integrated circuit modules respectively, or several of the modules or steps are formed into a single integrated circuit module. Therefore, the present application is not limited to the combination of specific hardware and software.

The embodiments described above are just some embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A method, comprising:
    obtaining a video loading instruction and sending a loading request to a cache server, wherein the loading request is configured to request loading data, and the loading data comprises at least one segment of the video corresponding to the video loading instruction, and wherein the loading data further comprises a Media Presentation Description (MPD) file of the video;
    receiving the loading data from the cache server; and
    playing the at least one segment according to the loading data,
    the method further comprising:
    parsing the MPD file to obtain a parsing result;
    determining segment information of a next segment of the at least one segment according to the parsing result; and
    sending a first segment loading request for the next segment to a source server according to the segment information, wherein the source server divides the video into a plurality of segments through Dynamic Adaptive Streaming over HTTP (DASH), the plurality of segments comprise the at least one segment, and the at least one segment in the cache server is obtained through the source server;
    wherein the sending a first segment loading request for the next segment to a source server according to the segment information comprises:
        determining a first resolution of the first segment;
        determining a resolution of the next segment as the first resolution; and
        sending the first segment loading request for the next segment having the first resolution to the source server according to the segment information; or
    wherein the sending a first segment loading request for the next segment to a source server according to the segment information comprises:
        determining a target Content Delivery Network (CDN) corresponding to the video; and
        sending the first segment loading request for the next segment to the source server according to the segment information, wherein the first segment loading request comprises the target CDN, and the source server is configured to determine a resolution of the next segment according to the target CDN.

2. The method of claim 1, wherein the loading data further comprises related data of a playing interface for playing the video, and playing the at least one segment comprises:
    playing the at least one segment on the playing interface, and displaying the related data on the playing interface.

3. The method of claim 1, wherein the source server comprises a plurality of correspondences, each of the correspondences comprises a CDN and a history network speed corresponding to the CDN, and the source server is configured to determine the history network speed corresponding to the target CDN according to the plurality of correspondences, and determine the resolution of the next segment according to the history network speed corresponding to the target CDN.

4. The method of claim 1, further comprising:
creating, in response to determining that the cache server does not store the at least one segment, a second segment loading request for requesting the at least one segment from the source server; and
sending the second segment loading request to the source server for the at least one segment.

5. A computing device, comprising:
one or more processors; and
one or more non-transitory computer-readable storage mediums containing instructions configured to cause the one or more processors to perform operations including:
obtaining a video loading instruction and sending a loading request to a cache server, wherein the loading request is configured to request loading data, and the loading data comprises at least one segment of the video corresponding to the video loading instruction, and wherein the loading data further comprises a Media Presentation Description (MPD) file of the video;
receiving the loading data from the cache server; and
playing the at least one segment according to the loading data,
the one or more non-transitory computer-readable storage mediums further containing instructions configured to cause the one or more processors to perform operations including:
parsing the MPD file to obtain a parsing result;
determining segment information of a next segment of the at least one segment according to the parsing result; and
sending a first segment loading request for the next segment to a source server according to the segment information, wherein the source server divides the video into a plurality of segments through Dynamic Adaptive Streaming over HTTP (DASH), the plurality of segments comprise the at least one segment, and the at least one segment in the cache server is obtained through the source server,
wherein the sending a first segment loading request for the next segment to a source server according to the segment information comprises:
determining a first resolution of the first segment;
determining a resolution of the next segment as the first resolution; and
sending the first segment loading request for the next segment having the first resolution to the source server according to the segment information; or
wherein the sending a first segment loading request for the next segment to a source server according to the segment information comprises:
determining a target Content Delivery Network (CDN) corresponding to the video; and
sending the first segment loading request for the next segment to the source server according to the segment information, wherein the first segment loading request comprises the target CDN, and the source server is configured to determine a resolution of the next segment according to the target CDN.

6. The computing device of claim 5, wherein the loading data further comprises related data of a playing interface for playing the video, and the one or more programs further comprise instructions for:
playing the at least one segment on the playing interface, and displaying the related data on the playing interface.

7. The computing device of claim 5, wherein the source server comprises a plurality of correspondences, each of the correspondences comprises a CDN and a history network speed corresponding to the CDN, and the source server is configured to determine the history network speed corresponding to the target CDN according to the plurality of correspondences, and determine the resolution of the next segment according to the history network speed corresponding to the target CDN.

8. The computing device of claim 5, the one or more non-transitory computer-readable storage mediums further containing instructions configured to cause the one or more processors to perform operations including:
creating, in response to determining that the cache server does not store the at least one segment, a second segment loading request for requesting the at least one segment from the source server; and
sending the second segment loading request to the source server for the at least one segment.

9. A non-transitory computer-program product tangibly embodied in a machine-readable non-transitory storage medium that includes instructions configured to cause one or more processors to:
obtain a video loading instruction and sending a loading request to a cache server, wherein the loading request is configured to request loading data, and the loading data comprises at least one segment of the video corresponding to the video loading instruction, and wherein the loading data further comprises a Media Presentation Description (MPD) file of the video;
receive the loading data from the cache server; and
play the at least one segment according to the loading data,
the non-transitory computer-program product further comprising instructions causing the one or more processors to:
parse the MPD file to obtain a parsing result;
determine segment information of a next segment of the at least one segment according to the parsing result; and
send a first segment loading request for the next segment to a source server according to the segment information, wherein the source server divides the video into a plurality of segments through Dynamic Adaptive Streaming over HTTP (DASH), the plurality of segments comprise the at least one segment, and the at least one segment in the cache server is obtained through the source server,
wherein the sending a first segment loading request for the next segment to a source server according to the segment information comprises:
determining a first resolution of the first segment;
determining a resolution of the next segment as the first resolution; and
sending the first segment loading request for the next segment having the first resolution to the source server according to the segment information; or
wherein the sending a first segment loading request for the next segment to a source server according to the segment information comprises:
determining a target Content Delivery Network (CDN) corresponding to the video; and
sending the first segment loading request for the next segment to the source server according to the segment information, wherein the first segment loading request comprises the target CDN, and the source server is configured to determine a resolution of the next segment according to the target CDN.

10. The non-transitory computer-program product of claim 9, wherein the loading data further comprises related data of a playing interface for playing the video, and playing the at least one segment comprises:
 playing the at least one segment on the playing interface, and displaying the related data on the playing interface.

11. The non-transitory computer-program product of claim 9, wherein the source server comprises a plurality of correspondences, each of the correspondences comprises a CDN and a history network speed corresponding to the CDN, and the source server is configured to determine the history network speed corresponding to the target CDN according to the plurality of correspondences, and determine the resolution of the next segment according to the history network speed corresponding to the target CDN.

* * * * *